P. B. RABE.
STORAGE BATTERY.
APPLICATION FILED APR. 30, 1919.

1,328,393.

Patented Jan. 20, 1920.

UNITED STATES PATENT OFFICE.

PAUL B. RABE, OF CHICAGO, ILLINOIS, ASSIGNOR TO O. K. GIANT BATTERY CO., OF GARY, INDIANA, A CORPORATION OF DELAWARE.

STORAGE BATTERY.

1,328,393.  Specification of Letters Patent.  Patented Jan. 20, 1920.

Application filed April 30, 1919. Serial No. 293,604.

*To all whom it may concern:*

Be it known that I, PAUL B. RABE, a citizen of the United States, residing at Chicago, in the county of Cook and State of Illinois, have invented a certain new and useful Improvement in Storage Batteries, (Case 2), of which the following is a full, clear, concise, and exact description, reference being had to the accompanying drawings, forming a part of this specification.

My invention relates to storage batteries, and is particularly applicable, though not necessarily limited, to a storage battery cell of small size capable of being used in connection with portable battery-operated devices of various kinds.

Among its objects my invention contemplates:

First: An extremely compact storage battery cell, the several parts of which are capable of being readily assembled;

Second: A storage battery cell wherein the several grids and grid spacers are mounted on a single support whereby the same may as a unit be inserted in the cell receptacle and be removed therefrom for purposes of inspection, substitution and repair;

Third: An improved arrangement affording communication between the interior of the cell and the atmosphere;

Fourth: A battery cell comprising a novel form of grid and a novel form of grid spacer.

Other objects of the invention will appear as this description progresses.

In the accompanying drawings illustrating my invention,

Similar characters of reference refer to similar parts throughout.

Figure 1:
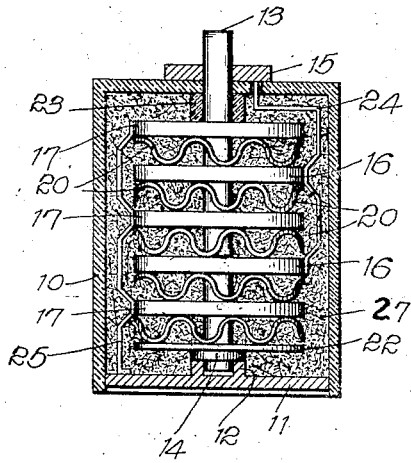
Figure 1 is a vertical sectional view of a cell embodying the improvements of my invention.
Figure 2:
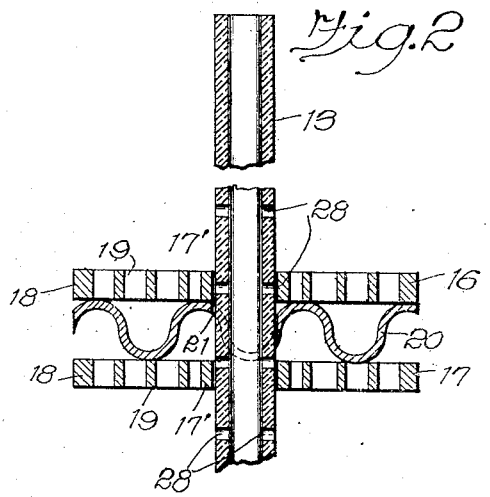
Fig. 2 is a fragmentary sectional view on a larger scale, illustrating two of the grids, a grid spacer, and the hollow rod whereon they are mounted.
Figure 4:
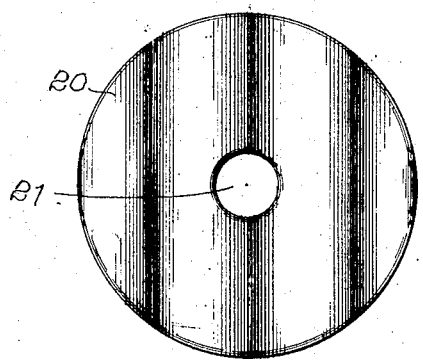
Fig. 4 is a plan view of one of the grid spacers.
Figure 3:
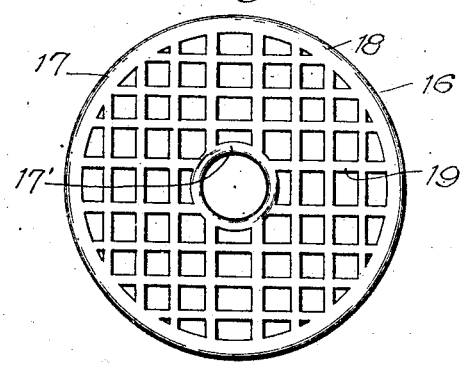
Fig. 3 is a plan view of one of the grids.

Referring first to Fig. 1, the cell there shown comprises the casing or receptacle 10, which is preferably of non-conducting material, and is provided with a separate end closure 11 of electricity-conducting material, retained in position in any suitable manner. The end closure 11 is provided on its inner surface with a hollow central boss 12 into which is fitted the lower end of a rod 13 conveniently provided with an annular shoulder 14 resting on the top of the boss 12. The rod 13 is formed of any non-conducting material, such, for instance, as hard rubber, which will not be chemically attacked by the substances within the cell. The upper end of the rod 13 extends through an aperture in the top of the receptacle 10, and inasmuch as the top of the receptacle conveniently carries a terminal contact 15, the rod 13 likewise extends through an aperture in said terminal contact.

Mounted upon the rod 13 is a plurality of concentrically disposed positive and negative grids indicated respectively at 16, 16 and 17, 17. Each of the grids comprises a substantially disk-shaped grid plate comprising a hub 17, outer ring 18, and an intervening cellular grid-paste receiving structure 19, all formed of one piece from any suitable grid plate material, such, for instance, as an alloy of lead and antimony.

The particular construction of the cellular grid-paste receiving structure is not of particular importance. The principal requirement is that said cellular structure shall be adapted to contain a sufficient quantity of any well-known negative or positive grid-paste material, as the case may be, and properly expose the same to the electrolyte. Intervening between the positive and negative grids are the spacers 20, 20, each of which is in the form of a disk cut from corrugated wood or other suitable material, and provided with a central aperture 21 to receive the rod 13. A rigid disk 22 of wood, hard rubber, or other suitable material, is interposed between the shoulder 14 of the rod 13 and the lowermost one of the spacers 20, properly to support the latter on rod 13. Interposed between the uppermost one of the grids 17 and the receptacle is a collar 23 of insulating material, which serves to hold the grids and grid spacers in the position shown when the several parts are assembled, as illustrated in the drawings. The several positive grids 16, 16 are connected by a jumper 24 of lead or lead alloy, which is preferably "burned" to the peripheries of said positive grids, and, without contacting with the grids of opposite polarity, is led through an aperture in the receptacle to the terminal contact 15. The negative grids 17, 17 are connected by a similar jumper 25, which leads to the electricity conducting end closure 11, which constitutes the negative terminal of the cell. Contained within the receptacle is any suitable liquid or non-liquid storage battery electrolyte 27. In the drawing I have illustrated what may be considered any suitable known form of non-liquid electrolyte.

It will be noted that the rod 13 is hollow, and is provided with a plurality of apertures 28, 28 which afford communication between the cell interior and the inside of the hollow rod. It is well known that commercial forms of non-liquid electrolyte are most effective when slightly moist, and I have found that by providing the construction shown the electrolyte is enabled to absorb sufficient moisture from the atmosphere to keep it in good condition.

It will be noted that the storage cell construction herein shown and described is very compact, and that the several grids and grid spacers are mounted on rod 13, and thus with the rod 13 constitute a unit which may be inserted in and removed from the cell receptacle as a whole.

Having thus described my invention, what I claim as new and wish to secure by Letters Patent of the United States is:—

1. A storage cell comprising in combination with a receptacle comprising end closures, one of which is separate from the rest of the receptacle, a hollow central boss on the inner face of the last-mentioned end closure, a rod of non-conducting material having one end fitted in said boss and the other end bearing in the opposite end closure, a plurality of positive and negative grid plates concentrically mounted on said rod, spacers on said rod between said grid plates, a jumper connecting the several positive plates, a jumper connecting the several negative plates, and an electrolyte in said receptacle.

2. A storage battery cell comprising a cylindrical receptacle of insulating material, an end closure of conducting material for said receptacle, a rod within said receptacle centrally disposed therein and supported by the receptacle end closures, a plurality of positive and negative grid plates mounted on said rod, a plurality of grid spacers, also mounted on said rod, an electrolyte in said receptacle, and jumpers electrically connecting grids of the same polarity, one of said jumpers being connected with said electricity-conducting end closure.

3. A storage cell comprising in combination with a suitable receptacle, an electrolyte therein, a hollow rod supported in said receptacle and having its interior open to the atmosphere, a plurality of grid plates supported by said rod, and apertures in said rod affording communication between the rod interior and the electrolyte.

4. A storage cell comprising in combination with a cylindrical receptacle, a non-liquid electrolyte in said receptacle, a central and vertically disposed rod of insulating material supported in said receptacle, said rod being hollow and having one end exposed to the atmosphere, apertures in said rod affording communication between the electrolyte and the atmosphere, a plurality of positive and negative grid plates supported by said rod, means for spacing said grid plates, and jumpers connecting grid plates of the same polarity.

In witness whereof, I hereunto subscribe my name this 22 day of April, 1919.

PAUL B. RABE.

Witnesses:
MARY FAE PETRIE,
EDNA V. GUSTAFSON.